United States Patent [19]

Harms et al.

[11] Patent Number: 4,806,640
[45] Date of Patent: Feb. 21, 1989

[54] TRIPHENDIOXAZINE REACTIVE DYESTUFFS

[75] Inventors: Wolfgang Harms; Klaus Wunderlich, both of Leverkusen, Fed. Rep. of Germany

[73] Assignee: Bayer Aktiengesellschaft, Leverkusen, Fed. Rep. of Germany

[21] Appl. No.: 77,939

[22] Filed: Jul. 27, 1987

Related U.S. Application Data

[63] Continuation of Ser. No. 868,961, May 30, 1986, abandoned.

[30] Foreign Application Priority Data

Jun. 7, 1985 [DE] Fed. Rep. of Germany ....... 3520391

[51] Int. Cl.$^4$ ..................... C07D 498/02; C09B 19/02
[52] U.S. Cl. ......................................... 544/76; 544/75
[58] Field of Search ..................................... 544/75, 76

[56] References Cited

U.S. PATENT DOCUMENTS

| | | | |
|---|---|---|---|
| 2,355,497 | 8/1944 | Zwilgmeyer | 544/76 |
| 3,996,221 | 12/1976 | Leng et al. | 544/76 |
| 4,400,504 | 8/1983 | Harms et al. | 544/76 |
| 4,588,810 | 5/1986 | Harms et al. | 544/76 |
| 4,591,643 | 5/1986 | Jäger | 544/76 |

FOREIGN PATENT DOCUMENTS 572015 4/1959 Belgium .
1368158 9/1974 United Kingdom .

*Primary Examiner*—Richard L. Raymond
*Attorney, Agent, or Firm*—Sprung Horn Kramer & Woods

[57] ABSTRACT

Dyestuffs of the formula

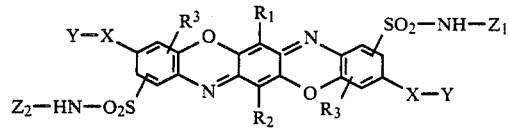

having the substituent meanings mentioned in the description, are suitable for dyeing and printing hydroxyl- or carbamoyl-containing materials, on which they produce light- and wet-fast dyeings and prints respectively.

3 Claims, No Drawings

TRIPHENDIOXAZINE REACTIVE DYESTUFFS

This is a continuation of application Ser. No. 868,961, filed Mar. 30, 1986, now abandoned.

The invention relates to dyestuffs of the formula

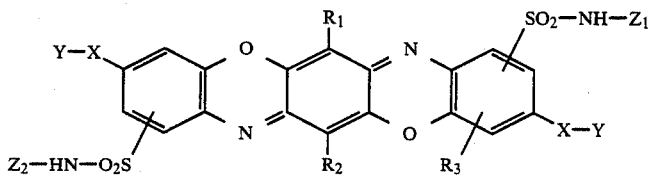

wherein
$R_1$, $R_2$ = H or substituent
$R_3$ = H or substituent
X =

$R_4$ = H or optionally substituted $C_1$-$C_4$-alkyl,
Y = optionally substituted hydrocarbon radical,
$Z_1$, $Z_2$ = H or heterocyclic fibre-reactive radical.

Suitable radicals $R_1$ and $R_2$ are hydrogen, Cl, Br, optionally substituted $C_1$-$C_4$-alkyl, $C_1$-$C_4$-alkoxy, phenoxy, carboxamide and acylamino, in particular optionally substituted $C_1$-$C_4$-alkylcarbonylamino or phenylcarbonylamino and carboxyl.

Optionally substituted carboxamide can be in particular $CONH_2$ or mono- or di-$C_1$-$C_4$-alkylcarboxamide.

Suitable radicals $R_3$ are in addition to hydrogen for example optionally substituted $C_1$-$C_4$-alkyl or $C_1$-$C_4$-alkoxy and Cl and Br.

Suitable radicals $R_4$ are in addition to hydrogen for example optionally OH—, $SO_3H$—, $OSO_3H$—, $OPO_3H_2$—, COOH— or halogen-substituted $C_1$-$C_4$-alkyl such as methyl, ethyl, propyl, butyl, hydroxyethyl, sulphatoethyl, sulphoethyl, phosphatoethyl, carboxyethyl, carboxypropyl, carboxybutyl, halogenoalkyl such as chloroethyl, chloropropyl, pentyl, hexyl.

Preferably $R_1$, $R_2$ stand for Cl, $R_3$ and $R_4$ for hydrogen.

Suitable radicals Y are in addition to H and $C_1$-$C_6$-alkyl in particular sulpho-, sulphato-, phosphato-, carboxyl-, thiosulphato, hydroxyl-, alkoxy-substituted $C_1$-$C_6$-alkyl radicals such as 2-sulphoethyl, 2-sulphatoethyl, 2-phosphatoethyl, 2-thiosulphatoethyl, 2-hydroxyethyl, 2-carboxyethyl, carboxymethyl, 3-sulpho-1-propyl, 3-sulphato-1-propyl, 3-phosphato-1-propyl, 2-sulpho-1-propyl, 2-sulphato-1-propyl, 3-hydroxy-1-propyl, 2-hydroxy-1-propyl, 2,3-dihydroxy-1-propyl, 2,3-disulphato-1-propyl, 3-sulpho-2-sulphato-1-propyl, 3-sulphato-1-sulpho-2-propyl, 3-chloro-2-hydroxy-1-propyl, 3-methoxy-1-propyl, 3-ethoxy-1-propyl, 3-carboxy-1-propyl, 1-carboxy-2-propyl, 4-sulpho-1-butyl, 4-sulphato-1-butyl, 4-hydroxy-1-butyl, 4-carboxy-1-butyl, 3-sulphato-1-butyl, 3-hydroxy-1-butyl, 3-sulphato-2-butyl, 3-hydroxy-2-butyl, 1-sulphato-2-butyl, 1-hydroxy-2-butyl, 1-hydroxy-2-methyl-2-propyl, 2-hydroxy-2-methyl-1-propyl, 2-sulphato-2-methyl-1-propyl, 5-carboxy-1-pentyl and alkyl radicals which are interrupted by hetero atoms or groups containing hetero atoms such as NH, O or $SO_2$ and are optionally substituted by the abovementioned substituents, such as
—$CH_2$—$CH_2$—O—$CH_2$—OH, —$CH_2$—$CH_2$—O—$CH_2$—$CH_2$—$OSO_3H$, —$CH_2$—$CH_2$—NH—$CH_2$—$CH_2$—OH, —$CH_2$—$CH_2$—NH—$CH_2$—$CH_2$—$OSO_3H$,

—$CH_2$—$CH_2$—N—$CH_2$—$CH_2$—OH,
　　　　　|
　　　　$CH_3$

—$CH_2$—$CH_2$—N—$CH_2$—$CH_2$—$OSO_3H$,
　　　　　|
　　　　$CH_3$

—$CH_2$—$CH_2$—S—$CH_2$—$CH_2$—OH, —$CH_2$—$CH_2$—$SO_2$—$CH_2$—$CH_2OH$, —$CH_2$—$CH_2$—$SO_2$—$CH_2$—$CH_2$—$OSO_3H$, —$CH_2$—$CH_2$—O—$CH_2$—$CH_2$—Cl, —$CH_2$—$CH_2$—O—$CH_2$—$CH_2$—$OPO_3H_2$, —$CH_2$—$CH_2$—$SO_2$—$CH_2$—$CH_2$—$OPO_3H_2$, —$CH_2$—$CH_2$—$SO_2$—$CH_2$—$CH_2$—$S_2O_3H$, —$CH_2$—$CH_2$—(O—$CH_2$—$CH_2$)$_{2-3}$—OH, —$CH_2$—$CH_2$—(O—$CH_2$—$CH_2$)$_{2-3}OCH_3$.

Cycloalkyl radicals such as cyclohexyl, 2-, 3-, 4-methylcyclohexyl, cyclopentyl, cyclohexylmethyl, aralkyl radicals such as benzyl, 2-, 3-, 4-sulphobenzyl, 2-phenyl-ethyl, 2-(2'-, 3'-, 4'-sulphophenyl)-ethyl, 1-phenyl-2-propyl, 1-(2'-, 3'-, 4'-sulphophenyl)-2-propyl, 2-phenyl-1-propyl, 2-(2'-, 3'-, 4'-sulphophenyl)-1-propyl, 3-phenyl-1-propyl, 3-(2'-, 3'-, 4'-sulphophenyl)-1-propyl, 1-phenyl-3-butyl, 1-(2'-, 3'-, 4'-sulphophenyl)-3-butyl, 2-benzyl-cyclcohexyl, 2-(2'-, 3'-, 4'-sulphobenzyl)-cyclohexyl, 5-methyl-1-phenyl-3-hexyl, 5-methyl-1-(2'-, 3'-, 4'-sulphophenyl)-3-hexyl, aryl radicals, in particular phenyl and sulpho-, carboxyl-, $C_1$-$C_4$-alkyl-, $C_1$-$C_4$-alkoxy-, halogen-substituted phenyl such as 2-, 3-, 4-sulphophenyl, 2,4-disulphophenyl, 2,5-disulphophenyl, 4-methyl-2-sulphophenyl, 3-methyl-4-sulpho-phenyl, 3-methyl-4,6-disulphophenyl, 2-methyl-4-sulphophenyl, 4-methoxy-2-sulphophenyl, 2-methoxy-4-sulphophenyl, 3-methoxy-4-sulphophenyl, 3-methoxy-4,6-disulphophenyl, 2-, 3-, 4-methylphenyl, 2-, 3-, 4-methoxyphenyl, 2,4-dimethylphenyl, 3,4-dimethylphenyl, 3,4-dimethyl-5-sulphophenyl, 2-, 3-, 4-chlorophenyl, 2,4-dimethoxyphenyl, 2,5-dimethoxyphenyl, 2,4-dimethoxy-5-sulphophenyl, 2,4-dimethoxy-3-sulphophenyl, 2,5-dimethoxy-4- and -5-sulphophenyl, 2-, 3-, 4-carboxyphenyl, 4-chloro-2-sulphophenyl, 4-acetylamino-2-sulphophenyl, 3-acetylamino-4,6-disulphophenyl.

Suitable fibre-reactive radicals, that is to say those reactive groups, i.e. groups, which react with OH or NH groups of the fibre under dyeing conditions to form covalent bonds, are in particular those which contain at least one reactive substituent bonded to a 5- or 6-membered aromatic heterocyclic ring or to a monazine, diazine, triazine, for example pyridine, pyrimidine, pyridazine, pyrazine, thiazine, oxazine or asymmetrical or symmetrical triazine ring or to such a ring system which has one or more fused-on aromatic carbocyclic rings, such as a quinoline, phthalazine, cinnoline, quinazoline, quinoxaline, acridine, phenazine and phenanthridine ring system.

Examples of the reactive substituents on the heterocycle are halogen (Cl, Br or F), ammonium including hydrazinium, sulphonium, sulphonyl, azido(—N₃), thiocyanato, thio, thioether, oxyether, sulphinic acid and sulphonic acid.

Specific examples are:
2,4-difluorotriazin-6-yl, 2,4-dichlorotriazin-6-yl, monohalogeno-sym.-triazinyl radicals, in particular mono- chloro- and monofluoro-triazinyl radicals which are substituted by alkyl, aryl, amino, monoalkylamino, dialkylamino, aralkylamino, arylamino, alkoxy, aryloxy, alkylthio, arylthio, where alkyl preferably denotes optionally substituted C₁–C₄-alkyl, aralkyl preferaly denotes optionally substituted phenyl-C₁–C₄-alkyl and aryl preferably denotes optionally substituted phenyl or naphthyl and where preferred substituents for alkyl or hydroxyl, cyano, C₁–C₄-alkoxy, carboxyl, sulpho or sulphato and for phenyl and naphthyl sulpho, C₁–C₄-alkyl, C₁–C₄-alkoxy, carboxyl, halogen or acylamino.

Specific examples are the following radicals:
2-amino-4-fluoro-triazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxy-ethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulphoethylamino-4-fluorotriazin-6-yl, 2-β-sulphoethyl-methylamino-4-fluorotriazin-6-yl, 2-carboxymethylamino-4-fluorotriazin-6-yl, 2-β-cyanoethylamino-4-fluorotriazin-6-yl, 2-benzoylamino-4-fluorotriazin-6-yl, 2-β-phenylethylamino-4-fluorotriazin-6-yl, 2-benzylmethylamino-4-fluorotriazin-6-yl, 2-(x-sulphobenzyl)-amino-4-fluorotriazin-6-yl, 2-cyclohexylamino-4-fluorotriazin-6-yl, 2-(o-, m-, p-methylphenyl)-amino-4-fluorotriazin-6-yl, 2-(o-, m-, p-sulphophenyl)-amino-4-fluorotriazin-6-yl, 2-(2′, 5′-disulphophenyl)-amino-4-fluorotriazin-6-yl, 2-(o-, m-, p-chlorophenyl)-amino-4-fluorotriazin-6-yl, 2-(o-, m-, p-methoxyphenyl)-4-fluorotriazin-6-yl, 2-(2′-methyl-4′-sulphophenyl)-amino-4-fluorotriazin-6-yl, 2-(2′-methyl-5′-sulphophenyl)-amino-4-fluorotriazin-6-yl, 2-(2′-chloro-4′-sulphophenyl)-amino-4-fluorotriazin-6-yl, 2-(2′-chloro-5′-sulphophenyl)-amino-4-fluorotriazin-6-yl, 2-(2′-methoxy-4′-sulphophenyl)-amino-4-fluorotriazin-6-yl, 2-(o-, m-, p-carboxyphenyl)-amino-4-fluorotriazin-6-yl, 2-(2′,4′-disulphophenyl)-amino-4-fluorotriazin-6-yl, 2-(3′,5′-disulphophenyl)-amino-4-fluorotriazin-6-yl, 2-(2′-carboxy-4′-sulphophenyl)-amino-4-fluoro-triazin-6-yl, 2-(2′-carboxy-5′-sulphophenyl)-amino-4-fluorotriazin-6-yl, 2-(6′-sulphonaphth-2′-ylamino-4-fluorotriazin-6-yl, 2-(4′,8′-disulphonaphth-2′-ylamino-4-fluorotriazin-6-yl, 2-(6′,8′-disulphonaphth-2′-ylamino-4-fluorotriazin-6-yl, 2-(N-methylphenyl)-amino-4-fluorotriazin-6-yl, 2-(N-ethylphenyl)-amino-4-fluorotriazin-6-yl, 2-(N-β-hydroxyethylphenyl)-amino-4-fluorotriazin-6-yl, 2-(N-iso-propylphenyl)-amino-4-fluorotriazin-6-yl, 2-morpholino-4-fluorotriazin-6-yl, 2-piperidino-4-fluorotriazin-6-yl, 2-(4′,6′,8′-trisulphonaphth-2′-ylamino-4-fluorotriazin-6-yl, 2-(3′,6′,8′-trisulphonaphth-2′-ylamino-4-fluorotriazin-6-yl, 2-(3′,6′-disulphonaphth-1′-ylamino-4-fluorotriazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, 2-methoxy-4-fluorotriazin-6-yl, 2-ethoxy-4-fluorotriazin-6-yl, 2-phenoxy-4-fluorotriazin-6-yl, 2-(o-, m- or p-sulphophenoxy)-4-fluorotriazin-6-yl, 2-(o-, m- or p-methyl- or -methoxyphenoxy)-4-fluorotriazin-6-yl, 2-β-hydroxyethylmercapto-4-fluorotriazin-6-yl, 2-phenylmercapto-4-fluorotriazin-6-yl, 2-(4′-methylphenyl)-mercapto-4-fluorotriazinyl, 2-(2′,4′-dinitrophenyl)-mercapto-4-fluoro-triazin-6-yl, 2-methyl-4-fluorotriazin-6-yl, 2-phenyl-4-trifluorotriazin-6-yl and the corresponding 4-chloro and 4-bromo radicals and the corresponding radicals obtainable by reaction of the halogen atoms with tertiary bases such as trimethylamine, triethylamine, dimethyl-β-hydroxyethylamine, triethanolamine, N,N-dimethylhydrazine, pyridine, α- or β-picoline, nicotinic acid or isonicotinic acid or sulphinates, in particular benzenesulphinic acid.

The halogenotriazinyl radicals can also be linked to a second halogenotriazinyl radical or halogenodiazinyl radical. Examples of such radicals are as follows:

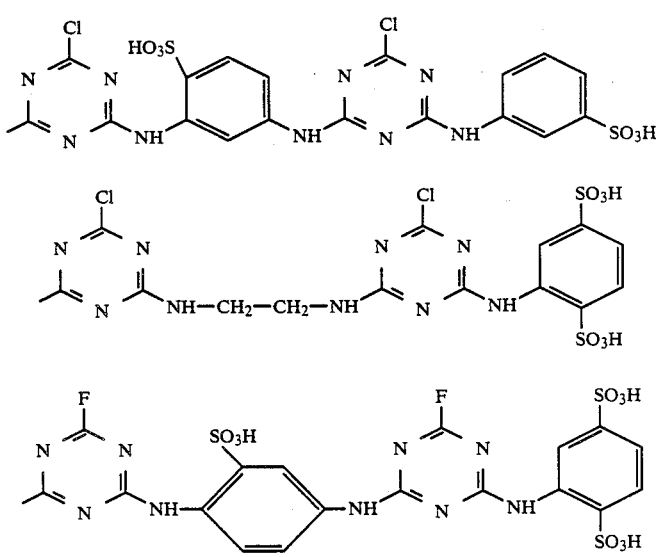

-continued
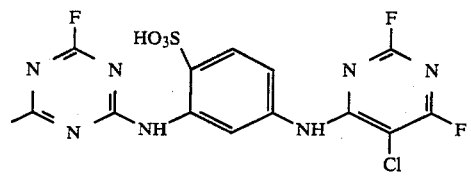
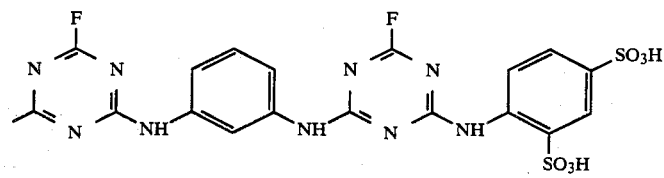
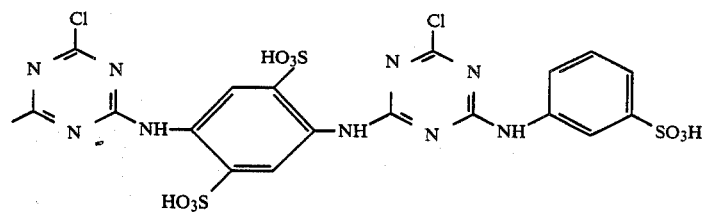
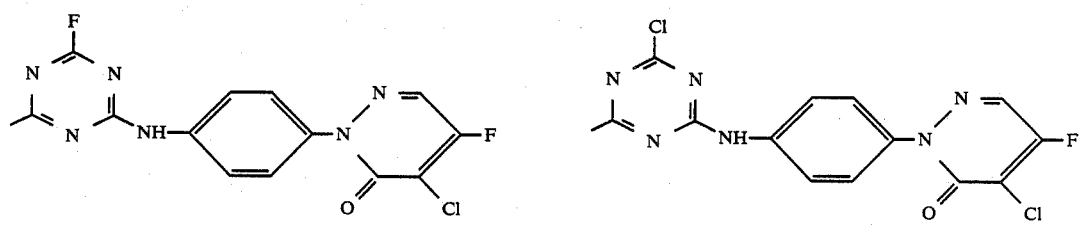
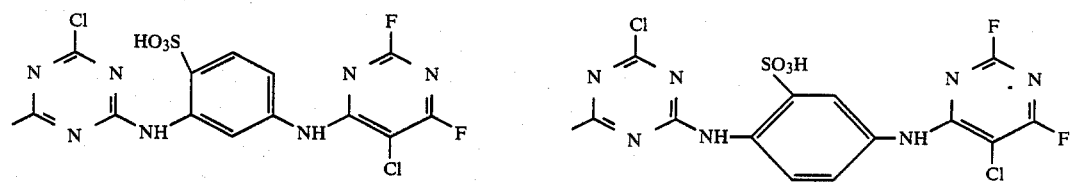
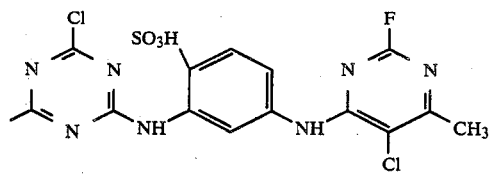
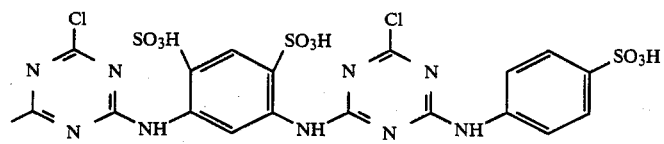
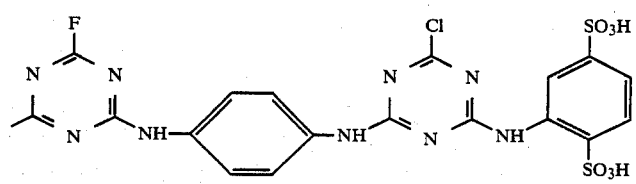

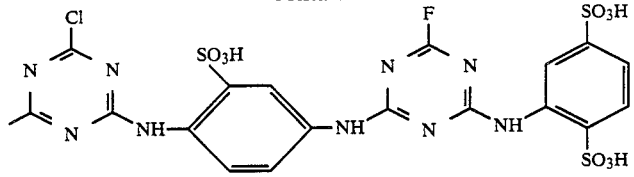

Further, the halogenotriazinyl radicals can also be linked to an amino radical capable of forming a vinyl-Sulphonyl radical, such as, for example 2-(2'-, 3'- or 4'-(β-sulphatoethylsulphonyl)-phenylamino-4-fluorotriazin-6-yl, 2-(2'-, 3'-, 4'-(β-thiosulphatoethylsulphonyl)-phenylamino)-4-fluorotriazin-6-yl, 2-(2'-, 3'-, 4'-(β-phosphatoethyl-sulphonyl)-phenylamino)-4-fluorotriazin-6-yl, 2-(2'-, 3'-, 4'-β-acetoxy-ethylsulphonyl)-phenylamino)-4-fluorotriazin-6-yl, 2-(2'-, 3'-, 4'-(β-chloroethylsulphonyl)-phenylamino)-4-fluorotriazin-6-yl, 2-(2'-, 3'-, 4'-vinylsulphonyl-phenylamino)-4-fluorotriazin-6-yl, 2-(2-(β-sulphatoethylsulphonyl)-ethylamino)-4-fluorotriazin-6-yl and the corresponding 2-substituted-4-chlorotriazin-6-yl radicals.

Furthermore, the reactive halogen atoms in the abovementioned 2-halogeno-4-substituted triazinyl radicals can also be reacted with tertiary bases such as trimethylamine, triethylamine, dimethyl-β-hydroxyethylamine, triethylamine, N,N-dimethylhydrazine, pyridine, α-, β-picoline, nicotinic acid or isonicotinic acid to form quaternary salts.

Mono-, di- or tri-halogen-pyrimidinyl radicals, such as 2,4-dichloropyrimidin-6-yl, 2,3,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-mono-, -di- or -tri-chloromethyl- or -5-carboalkoxy-pyrimidin-6-yl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridaz-6'-on-1'-yl)-phenylsulphonyl or -carbonyl,β-(4'5'-dichloropyridaz-6'-on-1'-yl)-ethylcarbonyl and the corresponding bromine and fluorine derivatives of the above-mentioned chlorine-substituted heterocyclic radicals, of these for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluormethyl-4-pyrimidinyl, 2-fluoro-5-phenyl or -5-methylsulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2-fluoro-4-dichloromethyl-5-chloropyrimidin-6-yl, 2-fluoro-5-chloropyrimidin-4-yl, 2-methyl-4-fluoro-5-methylsulphonylpyrimidin-6-yl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl, β-(4'-fluoro-5'-chloropyridaz-6'-on-1'-yl)-ethyl-carbonyl, sulphonyl-containing triazine radical, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl, 2,4-bis-(3'-carboxyphenylsulphonyl)-triazin-6-yl, sulphonyl-containing pyrimidine rings, such as 2-carboxymethylsulphonyl-pyrimidin-4-yl, 2-methylsulphonyl-6-methyl-pyrimidin-4-yl, 2-methylsulphonyl-6-ethylpyrimidin-4-yl, 2-phenylsulphonyl-5-chloro-6-methyl-pyrimidin-4-yl, 2,6-bis-methylsulphonylpyrimidin-4-yl, 2,6-bis-methylsulphonyl-5-chloro-pyrimidin-4-yl, 2,4-bis-methylsulphonyl-pyrimidine-5-sulphonyl, 2-methylsulphonyl-pyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methyl-pyrimidine-5-sulphonyl, 2-methylsulphonyl-5-nitro-6-methylpyrimidin-4-yl, 2,5,6-trismethylsulphonyl-pyrimidin-4-yl, 2-methylsulphonyl-5,6-dimethyl-pyrimidin-4-yl, 2-ethylsulphonyl-5-chloro-6-methyl-pyrimidin-4-yl, 2-methylsulphonyl-6-chloro-pyrimidin-4-yl, 2,6-bis-methylsulphonyl-5-chloro-pyrimidin-4-yl, 2-methylsulphonyl-6-carboxypyrimidin-4-yl, 2-methylsulphonyl-5-sulpho-pyrimidin-4-yl, 2-methylsulphonyl-6-carbomethoxypyrimidin-4-yl, 2-methylsulphonyl-5-carboxy-pyrimidin-4-yl, 2-methylsulphonyl-5-cyano-6-methoxy-pyrimidin-4-yl, 2-methylsulphonyl-5-chloro-pyrimidin-4-yl, 2-sulphoethylsulphonyl-6-methyl-pyrimidin-4-yl, 2-methylsulphonyl-5-bromo-pyrimidin-4-yl, 2-phenyl-sulphonyl-5-chloro-pyrimidin-4-yl, 2-carboxymethylsulphonyl-5-chloro-6-methyl-pyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl, 2-chlorobenzothiazole-5- or -6-carbonyl or -5- or -6-sulphonyl, 2-arylsulphonyl or alkylsulphonylbenzothiazole-5- or -6-carbonyl or -5- or -6-sulphonyl, such as 2-methylsulphonyl or 2-ethylsulphonyl-benzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives which contain sulpho groups in the fused-on benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methyl-1,3-thiazole-5-carbonyl or -4- or -5-sulphonyl, N-oxide of 4-chloro- or 4-nitro-quinoline-5-carbonyl.

Preferred fibre-reactive radicals $Z_1$, $Z_2$ which contain at least one reactive substituent bonded to a heterocyclic ring are fluorine- or fluorine-chlorine-containing pyrimidines, fluorine- or chlorine-containing triazines and dichloroquinoxalines.

Of the dyestuffs of the formula (I) preference is given to those of the formula

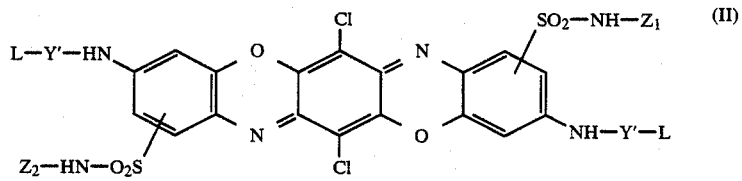

(II)

wherein
$Z_1$, $Z_2$ have the abovementioned meaning,
$Y'=C_1-C_6$-alkylene, Ar-$(C_1-C_4)$-alkylene,
$L=SO_3H$, $OSO_3H$, $OPO_3H_2$, $COOH$
and further preferred dyestuffs are those of the formula

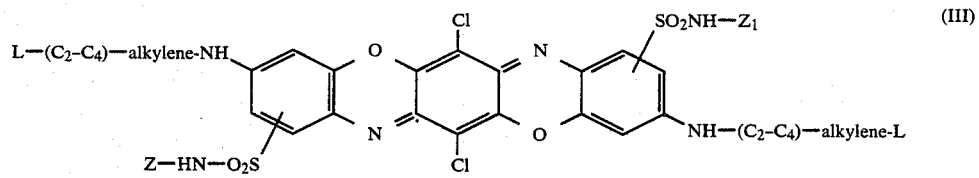

(III)

wherein
L has the abovementioned meaning and
Z stands for the radical of a halogenopyrimidine, halogenotriazine, in particular for fluoropyrimidinyl, monochloro- or monofluoro-s-triazinyl or for 2,3-dichloroquinoxaline-6-carbonyl or-6-sulphonyl.

Dyestuffs of the formula (I) where $Z_1$, $Z_2$=fibre-reactive radical are obtained by condensing compounds of the formula

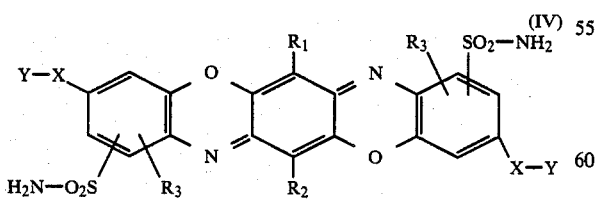

(IV)

wherein $R_1-R_3$, X and Y have the abovementioned meaning, with 2 moles of a reactive component Z'-Halogen  (V)

wherein

Z'=fibre-reactive radical
Halogen=F, Cl, Br.

The condensation of the dioxazine compounds of the formulae (IV) and Of the reactive components (V) is carried out either in aqueous or aqueous organic medium depending on the reactive component used at temperatures of 0°–80° C. and pH values of 7–11 in the presence of alkaline condensing agents such as aqueous alkaki metal hydrogencarbonate, alkali metal carbonate, alkali metal hydroxide, dialkali metal hydrogenphosphate or trialkali metal phosphate solution, or the condensation is carried out in aprotic organic solvents such as toluene, halogenobenzenes, nitrobenzene, dimethylformamide, N-methylpyrrolidone, tetramethylene sulphone, dimethyl sulphoxide, acetone, methyl ethyl ketone in the presence or absence of aprotic organic bases such as trialkylamine, N,N-dialkylaniline, pyridine or alkylpyridines at temperatures of 0°–80° C.

Condensation with less than 2 moles of (V) produces mixtures of mono- and bis-condensation product.

The preparation of compounds of the formula (IV) can be effected in conventional manner by condensing 1,4-benzoquinones of the formula

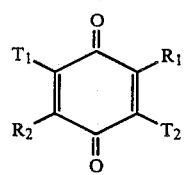

(VI)

wherein
$R_1$, $R_2$ have the abovementioned meaning and
$T_1$, $T_2$ denote hydrogen, Cl, Br, Oalkyl or O-aryl,
with 5-amino-2-(x-y-substituted)-benzenesulphonamides of the formula

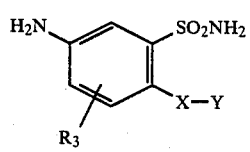

(VII)

wherein $R_3$, X and Y have the abovementioned meaning, to give compounds of the formula

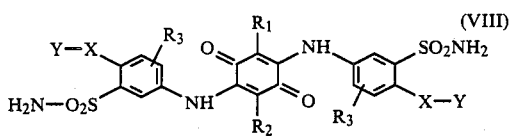

wherein $R_1-R_3$, X and Y have the abovementioned meaning, and subsequent cyclization of the dianilides (VIII) to the triphendioxazine compounds of the formula (IV)

Depending on the reaction conditions used for the cyclization, the sulphonamide groups in the benzo rings of the dioxazines (IV) can appear either in the o- or the p-position relative to the ring oxygen atoms of the dioxazine system.

The condensation of the benzoquinones of the formula (VI) with the aminobenzenesulphonamides (VII) is best effected in aqueous or aqueous organic medium in the presence of alkaline condensing agents and pH values of 3–11, preferably 4–8, at temperatures of 20°–90° C., preferably 40°–70° C. or in buffered solutions which contain the above alkaline condensing agents. However, it is also possible to work in a purely organic medium in the presence of acid-binding agents.

Alkaline condensing agents are for example sodium hydrogencarbonate, sodium carbonate, sodium acetate, potassium acetate, sodium hydroxide solution, potassium hydroxide solution, sodium phosphates, sodium borate.

In general the condensation products of the formula (VIII) are obtained as sparingly soluble, brown products.

A variant for preparing compounds of the formula (VIII) consists in the addition of aminobenzenesulphonamides of the formula (VII) onto 1,4-benzoquinones of the formula

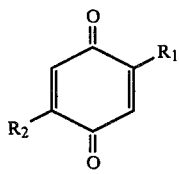

wherein $R_1$ and $R_2$ have the abovementioned meaning, and oxidation of the adduct intermediates.

The cyclization of the quinone condensation products (VIII) to the dioxazines (IV) can be effected by the known methods of German Offenlegungsschriften Nos. 2,122,262, 2,124,080, 2,302,283, 2,344,781, 2,503,611, 2,823,828 and of British Pat. No. 2,019,872, in particular in concentrated sulphuric acid and especially in oleum having $SO_3$ contents of 1–50% at temperatures of 10°–80° C. in the presence or absence of oxidizing agents such as potassium peroxodisulphate, ammonium peroxodisulphate, pyrolusite or organic peroxides.

A variant for preparing triphendioxazinesulphonamides of the formula (IV) consists in the condensation of appropriately substituted triphendioxazinesulphonyl chlorides which are obtainable from the triphendioxazines by sulphochlorination or from corresponding triphendioxazinesulphonic acids by known methods, with ammonia.

The new dyestuffs are valuable products which are distinguished by high tinctorial strengths. They are suitable in dispersed or dissolved form for a very wide variety of applications.

In the form of water-soluble compounds they are of preferred interest for the dyeing of hydroxyl- and carbamoyl-containing textile materials in particular materials of natural and regenerated cellulose and synthetic polyamide and polyurethane fibres, wool and silk.

If they are water-soluble reactive dyestuffs, the materials mentioned are dyed or printed by the methods commonly customary for reactive dyestuffs. The results are then light- and wet-fast dyeings and prints.

The temperatures given in the examples are in °C. The formulae of the water-soluble dyestuffs in the description and in the examples are the free acids. In the case of reactive dyestuffs, these are generally isolated and used in the form of their alkali metal salts in particular the lithium, sodium or potassium salts.

The numbers given in the examples to indicate the colour are the indicator numbers from the Colour Index hue indication chart.

EXAMPLE 1

24.0 g of the triphendioxazine compound of the formula

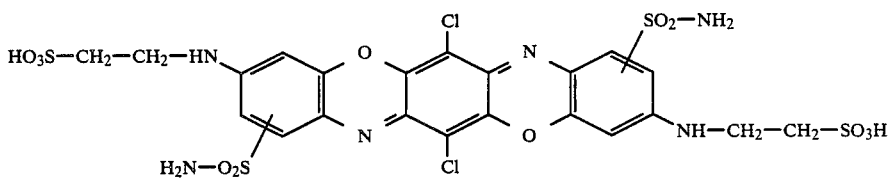

are dissolved in 720 ml of water. After cooling down to 0°–5° the solution is brought to pH 10.0 with 2N sodium hydroxide solution, and 7.8 ml of 2,4,6-trifluoro-5-chloropyrimidine are added dropwise in the course of 5 hours. The pH value is maintained at 9.5–10.0 four a further number of hours, and if necessary, after the absorption of sodium hydroxide solution has ceased, a further 2.0 ml of trifluorochloropyrimidine are added in the course of 2 hours, and the condensation is completed under the above conditions. The dyestuff is then salted out of the solution at 20° C. by gradual addition of 150 g of potassium chloride, the precipitate is filtered off with suction, the filter cake is washed with 20% strength potassium chloride solution, and the product is dried at 50° C. in a circulating air cabinet. This gives a dyestuff of the formula

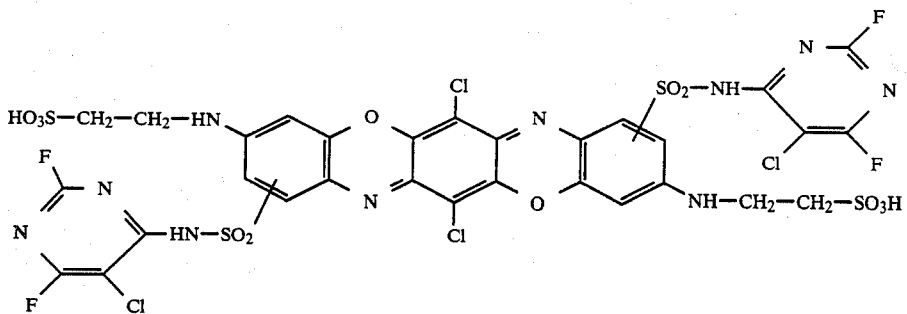

which dyes cotton from a long liquor in deep, bright blue shades having good fastness properties. C.I. indicator number 14, $\lambda_{max}=619$ nm in water.

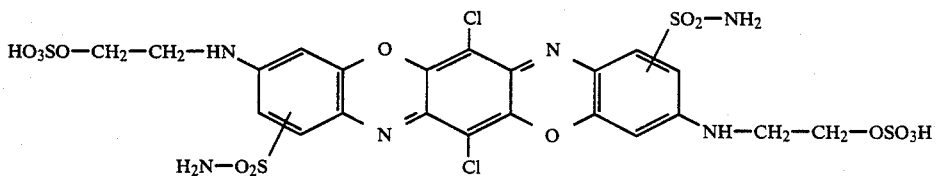

The triphendioxazinesulphonamide compound used at the beginning of Example 1 can be prepared as follows:

66.7 g of 5-nitro-2-($\beta$-sulphoethylamino)-benzenesulphonamide, prepared from 2-chloro-5-nitrobenzenesulphonamide and taurine, are reduced at 20°-60° C. in 450 ml of water in an autoclave in the presence of 2 g of Raney nickel under a hydrogen pressure of 60 bar. After the nickel has been filtered off, the solution of the resulting 5-amino-2-($\beta$-sulphoethylamino)-benzenesulphonamide has added to it 22.4 g of 2,3,5,6-tetrachlorobenzoquinone and 50 ml of isopropanol and is heated to 40° C. By dropwise addition of 2N sodium carbonate solution the pH value is throughout maintained at 5.5-6.0. After the reaction has ended, the precipitated brown dianilide is filtered off with suction, is washed with methanol or acetone and is dried at 50° C. in a circulating air cabinet.

29.1 g of the resulting dianilide are added at −5° to −10° C. to 84 ml of 10% strength oleum in the course of one hour. The temperature is then raised to 15° C., and 20.6 g of potassium peroxodisulphate are added with cooling at 10°-20° C. in the course of 45 minutes. After the reaction has ended, the reaction mixture is stirred into 600 g of ice, the precipitate is filtered off with suction and the filter cake is washed with dilute sodium chloride solution and is dried if desired at 60° C. in a circulating air cabinet.

EXAMPLE 2

25.0 g of triphendioxazine compound of the formula are dissolved at pH 10.5 in 750 ml of water. The solution is cooled down to 0°-5° C. and has added to it, dropwise, 10.0 ml of 2,4,6-trifluoro-5-chloropyrimidine in the course of 7 hours, during which the pH value in the reaction mixture is maintained at 9.5-10.0 by means of 2N sodium hydroxide solution. After the condensation has ended, the dyestuff is salted out with sodium chloride in fine needles, is filtered off with suction and is washed with 10% strength sodium chloride solution.

The dyestuff conforms essentially, apart from small amounts of monocoupled condensation product, to the formula

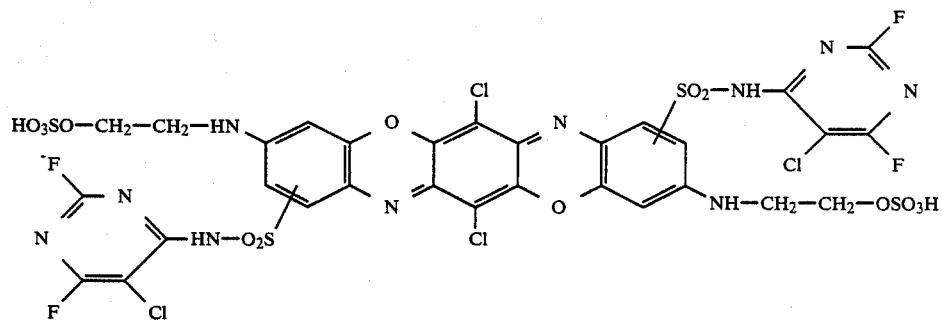

and dyes cotton from a long liquor in deep, bright blue shades having very good fastness properties. C.I. indicator number 14, $\lambda_{max}=619$ nm in water.

The triphendioxazinesulphonamide used above is obtained analogously to Example 1 as follows.

89.7 g of 2-($\beta$-hydroxyethylamino)-5-nitrobenzenesulphonamide are reduced at 20°-50° C. in 225 ml of water and 225 ml of isopropanol in an autoclave in the presence of Raney nickel under 60 bar of hydrogen pressure. After addition of a further 250 ml of water and heating to 80° C. the nickel is removed by clarification and the filter is cooled down to 0° C. The precipitated 5-amino-2-($\beta$-hydroxyethylamino)-benzenesulphonamide is filtered off with suction and dried.

30.4 g of aminobenzenesulphonamide obtained are condensed at 40° C. in 300 ml of water and 60 ml of isopropanol with 16.0 g of 2,3,5,6-tetrachlorobenzenequinone by addition of 2N sodium carbonate solution for constant regulation of pH value of 5.5–6.0.

The brown precipitate is filtered off with suction at 20° C., is washed with water and isopropanol and is dried. 38.0 g of the dianilides are added at −5° C. to 105 ml of 20% strength oleum in the course of 2 hours. This sodium chloride up to close to the saturation limit of the solution.

The precipitate is filtered off with suction, and the filter cake is washed with 25% strength potassium chloride solution and is dried at 50° C. in vacuo. The dyestuff obtained conforms essentially to the formula

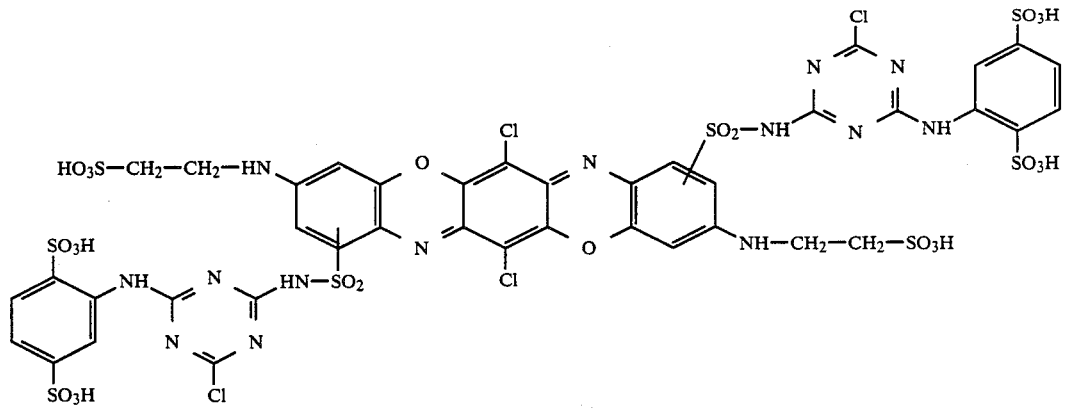

is followed by heating to +15° C. and addition at 15°–20° C. of 32.3 g of potassium peroxodisulphate in the course of 45 minutes. After the oxidation has ended, the reaction mixture is stirred into 600 g of ice, 60 g of sodium chloride are added, and the precipitate is filtered off with suction at 20° C. and washed with 5% strength sodium chloride solution. It can be dried at 50° C. in vacuo or be used in the moist state after the purity has been determined.

It can be used to print and dye cellulose fibres in deep bright blue shades.

C.I. indicator number 14, $\lambda_{max}$=619 nm in water.

A very similar dyestuff is obtained when in place of the taurine-substituted triphendioxazinesulphonamide the β-sulphatoethylamino-substituted triphendioxazinesulphonamide of Example 2 is condensed with 2-(2′,4′-dichlorotriazinyl)-aminobenzene-1,4-disulphonic acid.

EXAMPLE 3

9.2 g of triphendioxazinesulphonamide of Example 1

EXAMPLE 4

10.0 g of the triphendioxazine compound of the formula

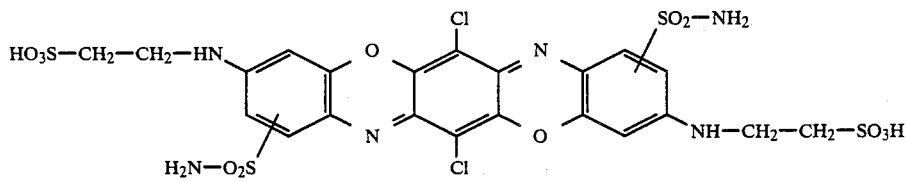

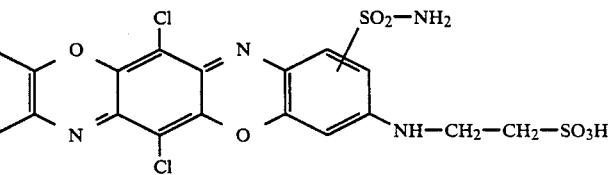

are dissolved at pH 9.5 in 300 ml of water by addition of dilute sodium hydroxide solution.

A solution of 12.3 g of 2-aminobenzene-1,4-disulphonic acid in 100 ml of water is condensed at 20° C. and pH 5.0 (by dropwise addition of 2N sodium carbonate solution) with 9.0 g of cyanuric chloride.

The solution of this reactive component is then gradually added dropwise at 20° C. to the above solution of the triphendioxazine compound in the course of a number of hours, and in the reaction mixture the pH value is maintained with 2N sodium hydroxide solution at 9.5. Stirring is continued under these conditions overnight, and the dyestuff formed is then salted out by means of are dissolved at 45° C. in 300 ml of water by addition of dilute sodium hydroxide solution up to a pH value of 9.0.

A solution of 11.0 g of 2,3-dichloroquinoxaline-6-sulphonyl chloride in 15 ml of N-methylpyrrolidone is added dropwise at 45° c. in the course of 30 minutes, and the pH value is constantly maintained at 9.0 with 2N sodium hydroxide solution. When the reaction has ended after a number of hours, the solution obtained is filtered. Potassium chloride is added to the filtrate to salt out the dyestuff, the precipitate is filtered off with suction, and the filter cake is washed with 25% strength potassium chloride solution. The filter cake is dried at 40° C. in vacuo. The resulting product of the formula

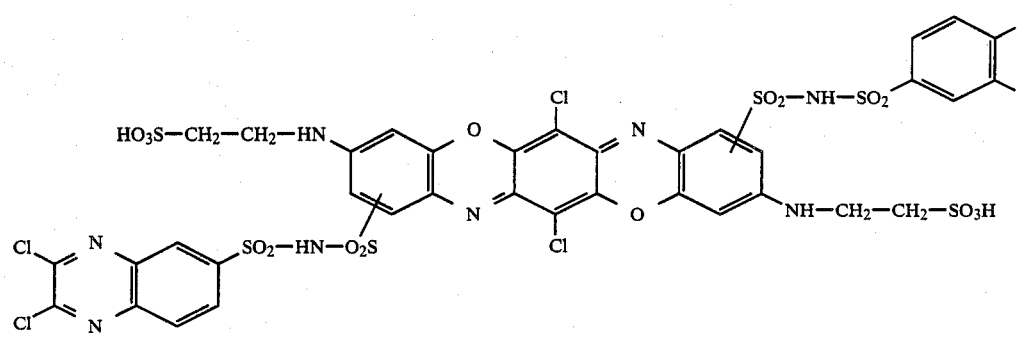

gives on cellulose fibres bright, blue dyeings. C.I.. indicator number 14, $\lambda_{max}$—654 nm in water.

EXAMPLE 5

If in Example 1 the diaminotriphendioxazinedisulphonamide compound used there is condensed not with 2,4,6-trifluoro-5-chloropyrimidine but analogously with 7.7 ml of 2,4-difluoro-5-chloro-6-methylpyrimidine and if the dyestuff solution is worked up as described there, this gives a dyestuff of the formula

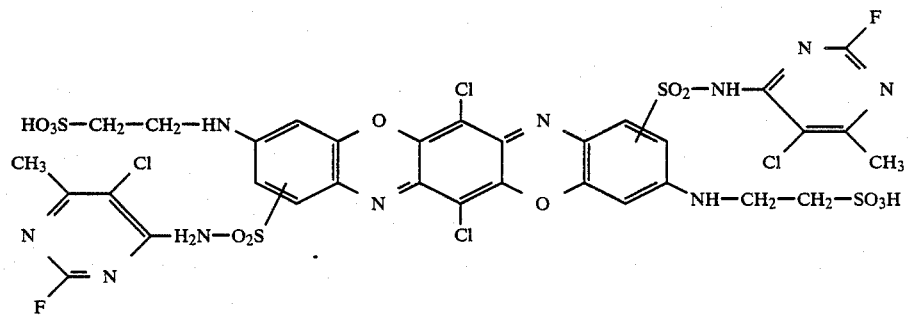

which produces deep, blue prints and dyeings on cellulose fibres. C.I. indicator number 14, $\lambda_{max}$=620 nm in water.

Further reactive dyestuffs of the general formula (I) which are likewise suitable for dyeing or printing cellulose fibres in bright, deep blue shades (C.I. indicator number 14) can be constructed by condensing the triphendioxazinesulphonamide compounds of the general formula $$\text{(X)}$$

wherein $R_1$, $R_2$ and Y have the meaning characterized in the examples of the table below, with the Z'-halogen reactive components listed in the last column of the table.

The number of the dyestuffs so preparable is not restricted to the indicator combinations but can be thought of as extending to further possible combinations.

TABLE

| No. | $R_1$ | $R_2$ | Y | Z'—halogen |
|---|---|---|---|---|
| 6 | —Cl | —Cl | —CH$_2$—CH$_2$—OSO$_3$H | CFCl$_2$ pyrimidine (F, F, Cl) |
| 7 | " | " | " | Cl—SO$_2$-phenyl-N=CCl-CCl=N |

TABLE-continued
| No. | R₁ | R₂ | Y | Z'—halogen |
|---|---|---|---|---|
| 8 | " | " | —CH₂—CH₂—CH₂—OSO₃H | 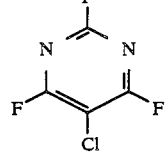 |
| 9 | " | " | 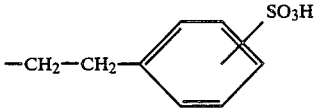 | " |
| 10 | " | " | —(CH₂)₄—SO₃H | " |
| 11 | " | " | 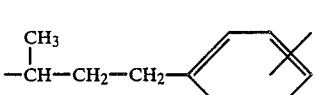 | " |
| 12 | Cl | Cl | 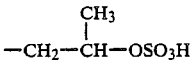 | 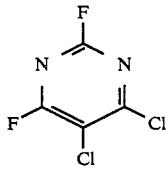 |
| 13 | " | " | 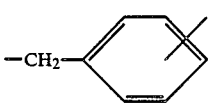 | 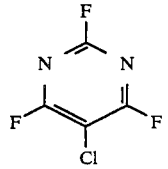 |
| 14 | " | " | —CH₂—CH₂—O—CH₂—CH₂—OSO₃H | " |
| 15 | " | " | —(CH₂)₄—OSO₃H | " |
| 16 | " | " | —CH₂—CH—CH₂—OSO₃H<br>          \|<br>       OSO₃H | " |
| 17 | " | " | —CH₂—CH₂—NH—CH₂—CH₂—OSO₃H | " |
| 18 | " | " | —CH₂—CH₂—SO₃H |  |
| 19 | Cl | Cl | —CH₂—CH₂—OPO₃H₂ | 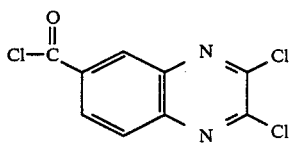 |
| 20 | " | " | —CH₂—CH₂—COOH | 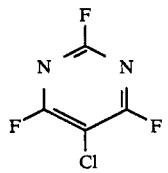 |

TABLE-continued
| No. | $R_1$ | $R_2$ | Y | Z'—halogen |
|---|---|---|---|---|
| 23 | " | " | $-CH_2-CH_2-SO_3H$ | 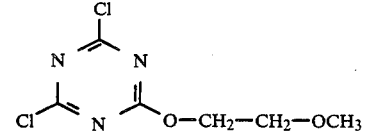 |
| 24 | " | " | $-CH_2-\underset{\underset{CH_3}{\mid}}{\overset{\overset{CH_3}{\mid}}{C}}-OSO_3H$ | 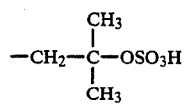 |
| 25 | " | " | $-CH_2-CH_2-CH_2-OSO_3H$ | 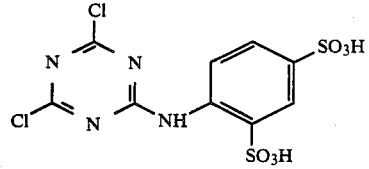 |
| 26 | " | " | $-CH_2-CH_2-SO_3H$ | 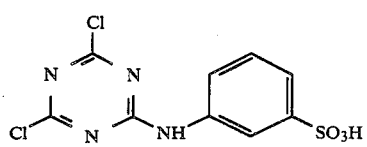 |
| 27 | " | " | " | 1. 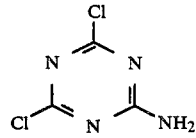 2. 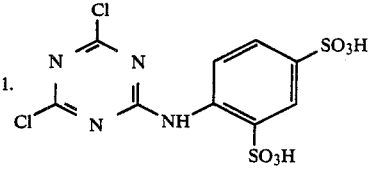 |
| 28 | " | " | 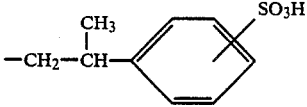 | 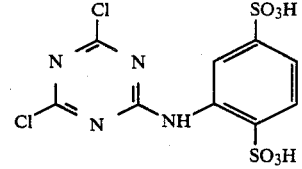 |
| 29 | " | " | $-CH_2-CH_2-CH_2OCH_3$ | 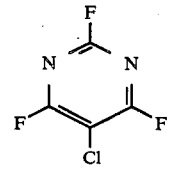 |
| 30 | " | " | $-(CH_2-CH_2-O)_3-CH_2-CH_2-OCH_3$ | 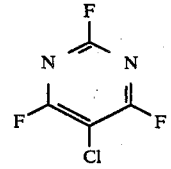 |
| 31 | " | " | $-CH_2-CH_2-\underset{\underset{CH_3}{\mid}}{CH}-OSO_3H$ | 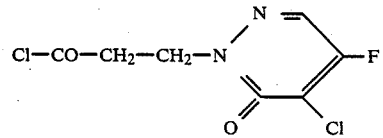 |

TABLE-continued

| No. | R₁ | R₂ | Y | Z'—halogen |
|-----|----|----|---|------------|
| 32 | " | " | —CH₂—CH₂—SO₃H | triazine with 2 Cl, O-linked to phenyl-SO₃H (para) |
| 33 | " | " | —CH₂—CH₂—CH₂—OSO₃H | triazine with 2 Cl, O-linked to naphthalene disulfonic acid |
| 34 | " | " | —CH₂—CH₂—OSO₃H | pyrimidine with 2 Cl, NO₂ |
| 35 | " | " | —CH₂—CH₂—SO₃H | pyrimidine with 3 Cl |
| 36 | " | " | —(CH₂)₄—OSO₃H | pyrimidine with 2 Cl, CN |
| 37 | " | " | —CH₂—COOH | triazine with 2 Cl, OCH₃ |
| 38 | " | " | —CH₂—(cyclohexyl-phenyl-SO₃H) | triazine with 2 Cl, NH-phenyl-(SO₃H)₂ |
| 39 | " | " | —CH₂—CH₂—OH | " |
| 40 | " | " | —CH₂—CH₂—COOH | pyrimidine with 2 F, Cl |
| 41 | " | " | —(CH₂)₅—COOH | triazine with 2 F, NH-phenyl-(SO₃H)₂ |

TABLE-continued
| No. | R₁ | R₂ | Y | Z'—halogen |
|---|---|---|---|---|
| 42 | " | " | —CH₂—CH₂—OSO₃H | 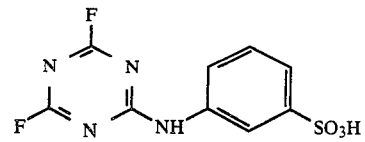 |
| 43 | " | " | —CH₂—CH₂—SO₃H | 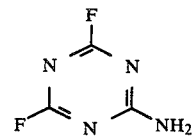 |
| 44 | " | " | —CH₂—CH₂—SO₃H | 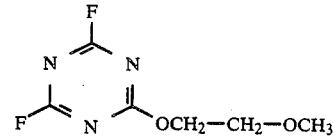 |
| 45 | " | " | —CH₂—CH₂—CH₂—OSO₃H | 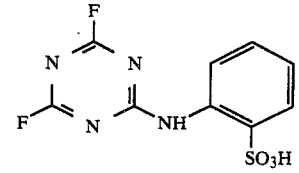 |
| 46 | " | " | —CH₂—CH₂—OSO₃H | 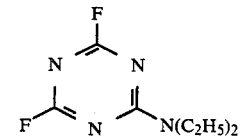 |
| 47 | H | H | —CH₂—CH₂—SO₃H | 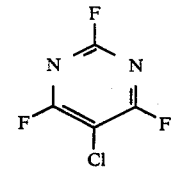 |
| 48 | NH—COCH₃ | NH—COCH₃ | —CH₂—CH₂—OSO₃H | 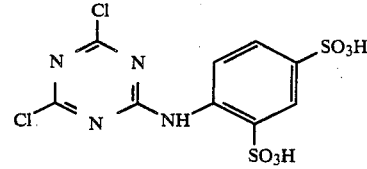 |
| 49 | CH₃ | CH₃ | —CH₂—CH₂—SO₃H | 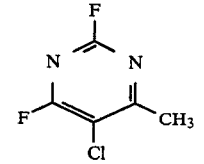 |
| 50 | CH₃ | Cl | —CH₂—CH₂—OSO₃H | 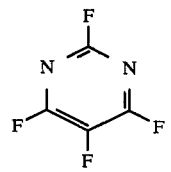 |

TABLE-continued
| No. | R₁ | R₂ | Y | Z'—halogen |
|---|---|---|---|---|
| 51 | Cl | Cl | —CH₂—CH₂—SO₃H | 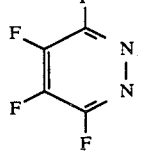 |
| 52 | OCH₃ | OCH₃ | —CH₂—CH₂—C₆H₄—SO₃H | 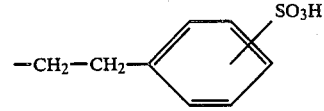 |
| 53 | OCH₃ | OCH₃ | —CH₂—CH₂—SO₃H | 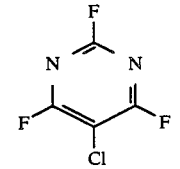 |
| 54 | Br | Br | —CH₂—CH₂—OSO₃H | 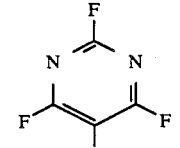 |
| 55 | Cl | Cl | —CH₂—CH₂—SO₃H | 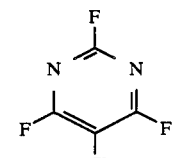 |
| 56 | " | " | —CH₂—CH₂—OSO₃H | 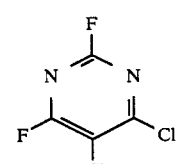 |
| 57 | Cl | Cl | —CH₂—CH₂—SO₃H | 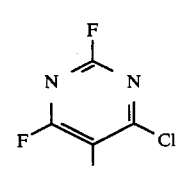 |
| 58 | Cl | Cl | " | 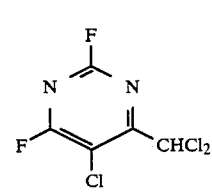 |
| 59 | Cl | Cl | —CH₂—CH₂—CH₂—OSO₂H | 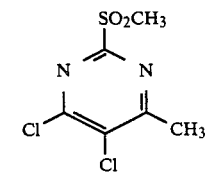 |

TABLE-continued
| No. | R₁ | R₂ | Y | Z'—halogen |
|---|---|---|---|---|
| 60 | Cl | Cl | —CH₂—CH₂—SO₃H | 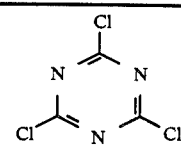 |
| 61 | Cl | Cl | —CH₂—CH—CH₂—SO₃H<br>　　　　 \|<br>　　　　OSO₃H | 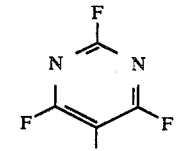 |
| 62 | Cl | Cl | —CH₂—CH₂—C₆H₄—SO₃H | 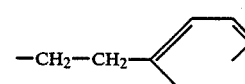 |
| 63 | Cl | Cl | —CH₂—CH₂—O—CH₂—CH₂—OSO₃H | 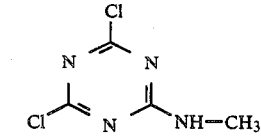 |
| 64 | Cl | Cl | —CH₂—CH₂—SO₃H | 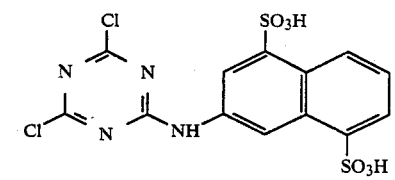 |
| 65 | Cl | Cl | CH₃ CH₃<br>\|　  \|<br>—CH—CH—OSO₃H | 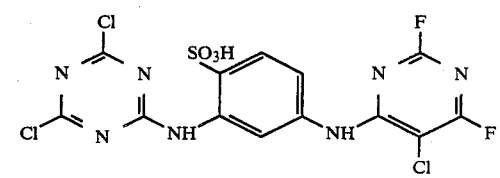 |
| 66 | Cl | Cl | CH₃ CH₃<br>\|　  \|<br>—CH—CH—OSO₃H | 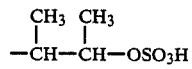 |
| 67 | Cl | Cl | —CH₂—CH₂—SO₃H | 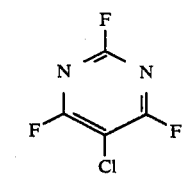 |
| 68 | Cl | Cl | —CH₂—CH₂—OSO₃H | 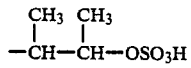 |
| 69 | Cl | Cl | —CH₂—CH₂—OSO₃H | 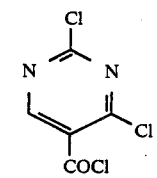 |

TABLE-continued

| No. | R₁ | R₂ | Y | Z'—halogen |
|-----|----|----|---|------------|
| 70 | Cl | Cl | phenyl with SO₃H and OCH₃ | 2-fluoro-4-fluoro-5-chloro-6-fluoropyrimidine |
| 71 | Cl | Cl | phenyl with SO₃H and OCH₃ | 2,4-dichloro-6-[(4-sulfophenyl)amino]-1,3,5-triazine |
| 72 | Cl | Cl | phenyl with (SO₃H)₂ | 2-fluoro-4-fluoro-5-chloro-6-fluoropyrimidine |
| 73 | Cl | Cl | phenyl with CH₃ and (SO₃H)₂ | 2-fluoro-4-fluoro-5-chloro-6-fluoropyrimidine |
| 74 | Cl | Cl | phenyl with SO₃H and Cl | 2-fluoro-4-fluoro-5-chloro-6-fluoropyrimidine |
| 75 | Cl | Cl | phenyl with SO₃H and CH₃ | 2,4-difluoro-6-[(2-sulfophenyl)amino]-1,3,5-triazine |
| 76 | Cl | Cl | —H | 2-fluoro-4-fluoro-5-chloro-6-fluoropyrimidine |
| 77 | Cl | Cl | —H | 1. 2,4,6-trichloro-1,3,5-triazine; 2. 3-aminobenzenesulfonic acid |

TABLE-continued

| No. | R₁ | R₂ | Y | Z'—halogen |
|---|---|---|---|---|
| 78 | Cl | Cl | $-C_2H_5$ | (2,6-difluoro-5-chloropyrimidin-4-yl) |
| 79 | Cl | Cl | $-CH_2-CH_2-SO_3H$ | (2,4,5-trichloropyrimidin-6-yl with COCl) |
| 80 | Cl | Cl | $-CH_2-CH_2-SO_3H$ | (2,4-dichloro-5-chlorosulfonylpyrimidin-6-yl) |
| 81 | " | " | " | (dichlorotriazinyl-NH-phenyl-$SO_2-CH_2-CH_2-OSO_3H$, para) |
| 82 | " | " | " | (dichlorotriazinyl-NH-phenyl-$SO_2-CH_2-CH_2-OSO_3H$, meta) |
| 83 | " | " | $-CH_2-CH_2-OSO_3H$ | " |
| 84 | " | " | " | (difluorotriazinyl-NH-phenyl-$SO_2-CH_2-CH_2-OSO_3H$) |

EXAMPLE 85

18.8 g of the triphendioxazinesulphonamide dyestuff base of Example 1 are condensed at 20° C. and pH 10.0 (by dropwise addition of sodium hydroxide solution) in 200 ml of water with 10.7 g of 2,4-dichloro-6-methoxy-triazine. After clarification of the solution the filtrate has added to it 22% of potassium chloride, and the filtrate is filtered off with suction and washed with 25% strength potassium chloride solution. This gives a dyestuff of the formula

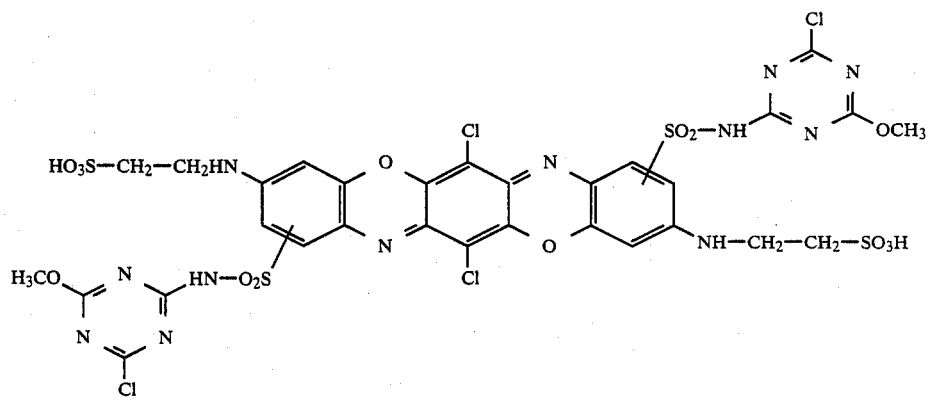

$\lambda_{max}$=621 nm in water, which is dried at 50° C. in vacuo. It can be used to print cellulose fibres in light- and wet-fast deep blue shades.

EXAMPLE 86

30. 0 g of the dyestuff of Example 85=21.0 g of salt- and water-fred dyestuff are dissolved at 25° C. in 400 ml of water.

14.0 g of sodium sulphite are added to this solution in the course of about 30 minutes, during which the pH value rises to 9.3.

The solution obtained is stirred at 20° C. for about 20 hours until the replacement of the chlorine atom by the sulphonic acid grouping is complete. The dyestuff is salted out by saturating the solution with potassium chloride, is filtered off with suction, is washed with 25% strength potassium chloride solution and is dried.

This gives, in the form of the salt, a dyestuff of the formula

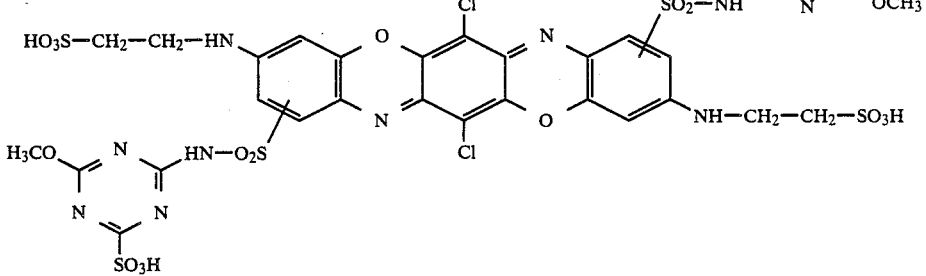

$\lambda_{max}$=620 nm in water, with which cellulose fibres can be printed in light- and wet-fast deep blue shades.

We claim:
1. A dyestuff of the formula

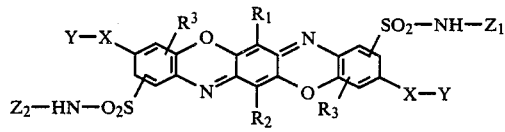

wherein
$R_1$, $R_2$=H, Cl, Br, $C_1$-$C_4$-alkoxy, $C_1$-$C_4$-alkyl, phenoxy, carboxamide, mono- or di-$C_1$-$C_4$-alkyl car-
boxamide, carboxy, $C_1$-$C_4$-alkylcarbonylamino or phenylcarbonylamino
$R_3$=H, $C_1$-$C_4$-alkyl, $C_1$-$C_4$-alkoxy, Cl or Br
X=

or O
$R_4$=H or $C_1$-$C_4$-alkyl opt. substituted by OH, SO$_3$H, OSO$_3$H, OPO$_3$H$_2$, COOH or Cl
Y=$C_1$-$C_6$-alkyl, opt. substituted by sulpho, sulphato, phosphate, carboxy, thiosulphato, hydroxy or alkoxy and opt. interrupted by NH, O or SO$_2$
$Z_1$, $Z_2$=heterocyclic fibre-reactive radical.
2. A dyestuff of the formula

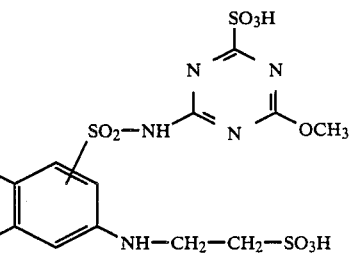

wherein
Y'=$C_1$-$C_6$-alkylene or Ar-($C_1$-$C_4$)-alkylene,
L=SO$_3$H, OSO$_3$H, OPO$_3$H$_2$ or COOH, and
Ar=arylene; $Z_1$, $Z_2$=heterocyclic fibre-reactive radical.
3. A dyestuff according to claim 2 of the formula

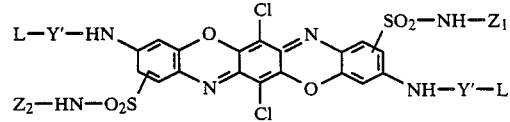

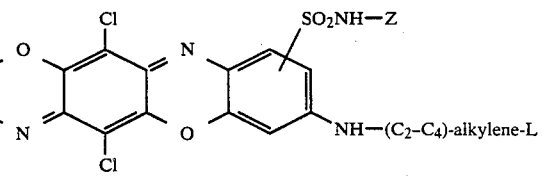

wherein
Z stands for the radical of a halogenopyrimidine, a halogenotriazine, a 2,3-dichloroquinoxaline-6-carbonyl or a 2,3-dichloroquinoxaline-6-sulphonyl.

* * * * *

UNITED STATES PATENT AND TRADEMARK OFFICE
CERTIFICATE OF CORRECTION

PATENT NO. : 4,806,640

DATED : February 21, 1989

Page 1 of 2

INVENTOR(S) : Wolfgang Harms, et al

It is certified that error appears in the above-identified patent and that said Letters Patent is hereby corrected as shown below:

| | |
|---|---|
| Col. 1, line 7 | Beginning of formula insert "$Y-X\underset{\underset{--}{\|}}{\overset{R^3}{\diagup}}\kern-0.5em\diagdown R^3$" as follows: -- |
| Col. 3, line 18 | After "alkyl" delete "or" and substitute --are-- |
| Col. 4, line 33 | Delete "trifluorotriazin" and substitute --fluorotriazin-- |
| Col. 7, line 30 | Delete "halogen" and substitute --halogeno-- |
| Col. 9, line 34 | Beginning of formula delete "alkylene-NH" and substitute --alkylene-HN-- |
| Col. 9, line 34 | End of formula delete "$Z_1$" and substitute --Z-- |
| Col. 10, line 9 | Delete "alkaki" and substitute --alkali-- |
| Col. 10, line 9 | After "carbonate" delete "." and substitute --,-- |
| Col. 11, line 66 | Delete "2,302,283" and substitute --2,302,383-- |
| Col. 12, line 57 | Delete "four" and substitute --for-- |
| Col. 15, line 2 | Before "5.5" delete "of" and substitute --to-- |
| Col. 16, line 62 | After "45°" delete "c." and substitute --C.-- |

UNITED STATES PATENT AND TRADEMARK OFFICE
CERTIFICATE OF CORRECTION

PATENT NO. : 4,806,640

DATED : February 21, 1989

INVENTOR(S) : Wolfgang Harms, et al

It is certified that error appears in the above-identified patent and that said Letters Patent is hereby corrected as shown below:

Col. 27, Example No. 59, under "Y"   Delete formula and substitute -- $-CH_2-CH_2-CH_2-OSO_3H$ --

Col. 35, line 7   Delete "water-fred" and substitute --water-free--

Signed and Sealed this

Thirteenth Day of February, 1990

Attest:

JEFFREY M. SAMUELS

*Attesting Officer*   *Acting Commissioner of Patents and Trademarks*